No. 811,808. PATENTED FEB. 6, 1906.
S. W. WIBEL, W. R. CUNNINGHAM & H. A. GRAY.
CAR COUPLING.
APPLICATION FILED JAN. 30, 1905.
2 SHEETS—SHEET 1.
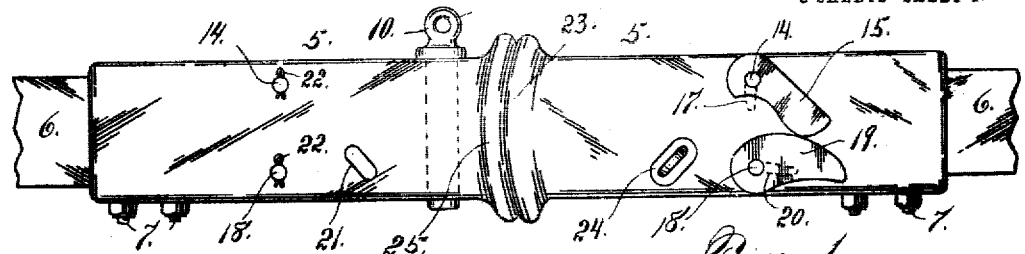
Fig. 1.
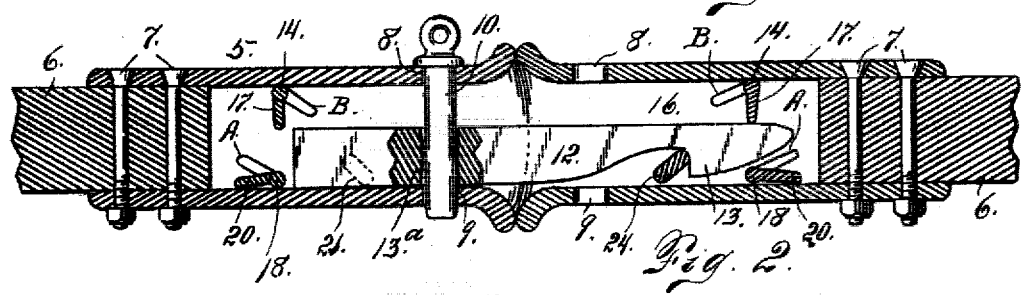
Fig. 2.
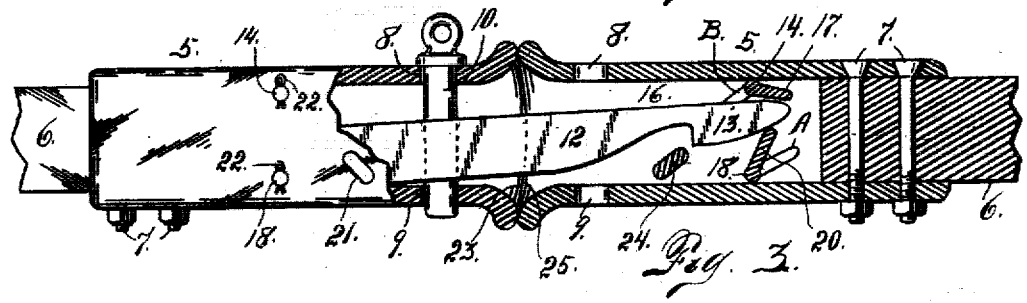
Fig. 3.
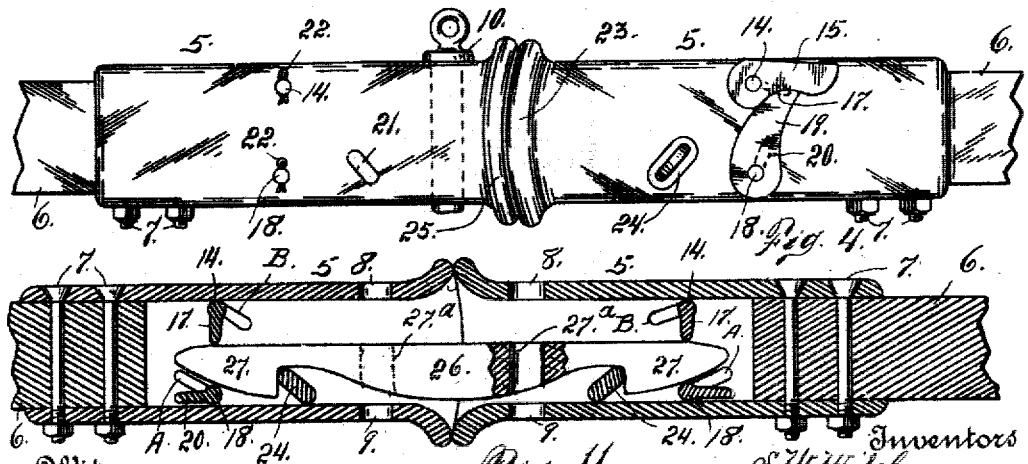
Fig. 4.
Fig. 11.
Witnesses
Otto E. Hoddick.
Dena Nelson.
Inventors
S. W. Wibel
W. R. Cunningham
H. A. Gray
by
Attorney

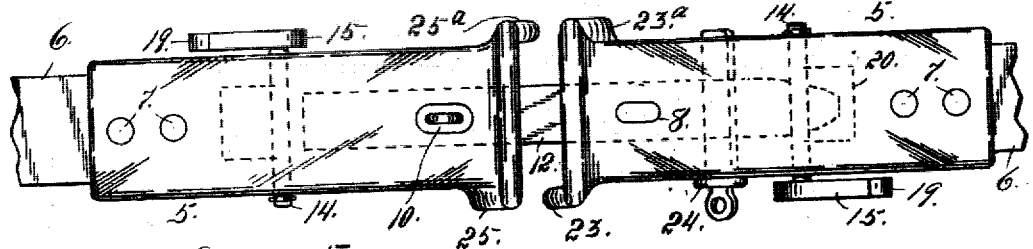
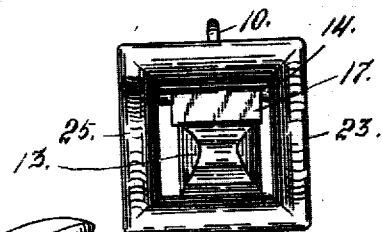
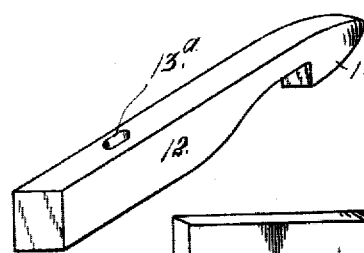
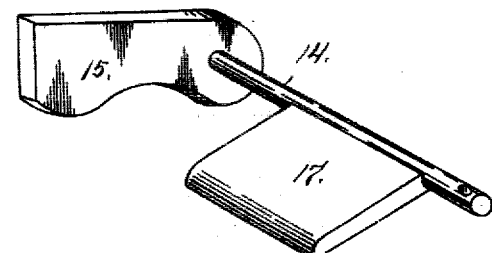
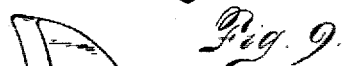
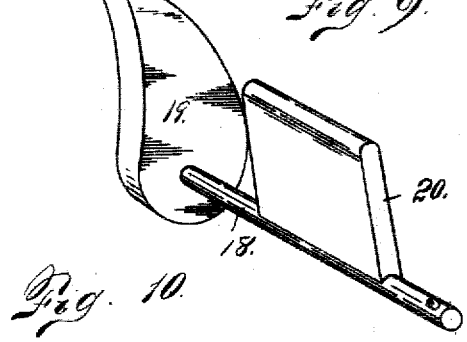

UNITED STATES PATENT OFFICE.

SOLOMON W. WIBEL AND WILLIAM R. CUNNINGHAM, OF DENVER, AND HORACE A. GRAY, OF ARVADA, COLORADO.

CAR-COUPLING.

No. 811,808.     Specification of Letters Patent.     Patented Feb. 6, 1906.

Application filed January 30, 1905. Serial No. 243,173.

*To all whom it may concern:*

Be it known that we, SOLOMON W. WIBEL and WILLIAM R. CUNNINGHAM, residing in the city and county of Denver, and HORACE A. GRAY, residing at Arvada, Jefferson county, State of Colorado, citizens of the United States, have invented certain new and useful Improvements in Car-Couplers; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in car-couplers more especially adapted for use with radiating draw-bars or draw-bars pivotally connected with the respective cars, such as are commonly used in street-railway service.

Our object is to provide a thoroughly-practicable coupler construction more especially adapted for use for the class of work just indicated.

Our further object is to provide a device of this class which shall be simple in construction, economical in cost, reliable, durable, and efficient in use; and to these ends the invention consists of the features, arrangements, and combinations hereinafter described and claimed, all of which will be fully understood by reference to the accompanying drawings, in which is illustrated an embodiment thereof.

In the drawings, Figure 1 is a side elevation of two draw-heads shown in the coupled position, the same being equipped with our improvements. Fig. 2 is a vertical section taken through the same, showing the parts in the coupled or locked position. Fig. 3 is a similar view showing the parts in the unlocked position. Fig. 4 is a side elevation with the parts in the position indicated in Fig. 3. Fig. 5 is a top or plan view of two draw-heads slightly separated in order to indicate the interlocking recesses and projections on the sides of the heads. Fig. 6 is a front elevation of a draw-head equipped with our improvements. Figs. 7, 8, 9, and 10 are perspective views, on a larger scale, of the movable features of the mechanism. Fig. 11 is a vertical section taken through two draw-heads, showing the parts in the coupled position, being a modified form of construction.

The same reference characters indicate the same parts in all the views.

Referring first more especially to the construction shown in Figs. 1 to 10, inclusive, let the numeral 5 designate a draw-head which is rigidly secured to a bar 6 by bolts 7. It will be assumed that the bar 6 is pivotally connected with a car (not shown) at a suitable point. The bar is broken off beyond the pivot. Consequently the latter is not disclosed. In the upper and lower walls of each draw-head are formed openings 8 and 9, which coincide as to position and are adapted to receive a pin 10, which holds the coupling device 12 in place, the latter being provided with a registering opening. There is only one coupling device employed with the two draw-heads. This device may be connected with either draw-head by the use of the pin 10. Hence when the pin is in one draw-head the holes 8 and 9 of the other draw-head are unoccupied. The two draw-heads, however, are of substantially the same construction. The coupling device 12 is provided with a hook-shaped head 13, adapted to engage a pin 24, mounted in the draw-head and shown somewhat elongated in cross-section and occupying an inclined position in order to facilitate its connection with the head of the coupling device as the latter enters the draw-head. In the upper part of each draw-head is journaled a spindle 14, whose outer extremity is provided with an exposed crank-arm 15, which is fast on the spindle. Within the chamber 16 of the draw-head the spindle is provided with a projection 17, which when occupying the depending position (shown in Fig. 2) engages the coupling device from above and holds the latter in the locked position. The relative positions of the projection 17 and the crank-arm 15 are such that the part 17 will normally assume by gravity the locking position. The position of the arm 15, however, is such as to form an angle with the projection 17 for a purpose hereinafter apparent. Near the bottom of the draw-head is journaled a spindle 18, having an exteriorly-exposed cam 19 secured to its outer extremity and adapted to act on the crank 15 to throw the part 17 to the unlocked position. The spindle 18 is also provided with a projection 20, located within the chamber of the draw-head and adapted to act on the extremity 13 of the coupling device to raise the latter to the unlocked position simultaneously with the action of the cam 19 on the arm 15 to raise the part 17 in order to permit the coupling-hook to rise, as stated. The projections 17 and 20 occupy the relative position shown in Fig. 2 when the part 17 is in the locking position and the coupling device in the coupled position. At the same time the parts 15 and 19 occupy the relative position shown in Fig. 1. Now if it is desired to uncouple the cars the workman by the use of any suitable instrument (not shown) lifts the cam 19 to the position shown in Fig. 4, whereby the parts are thrown to the unlocked and uncoupled position, as shown in Fig. 3. It will be observed, however, that the part 19 acts on the part 15 before the part 20 acts on the coupling device 12 in order that the part 17 may be raised sufficiently to allow the hook 12 to move upwardly by the time the part 20 engages the said hook.

As shown in the drawings, both draw-heads may be provided with spindles 14 and 18 and their attachments at the same time, as clearly illustrated in Fig. 2. However, when the vertical pin 10 is employed to hold the coupling device in place only one pin 24 is employed. The draw-head in which the pin 24 is not located, however, is provided with an opening. (Shown in dotted lines at the left of Fig. 2 and designated 21.) It will be understood from the foregoing description that the coupling device 12 may be changed from one draw-head to another by simply removing the pin 10 from one draw-head and the pin 24 from the other draw-head, taking out the coupling device 12 and inserting it in the opposite draw-head, so that its opening 13ª shall register with the openings 8 and 9. The pin 10 is then dropped into place in the one draw-head and the bolt 24 inserted in the other draw-head. The operation of our improved device will now be described. If it is desired to couple two cars, it may be assumed that the spindles 14 and 18 and their attachments of one draw-head are in the position shown in Figs. 3 and 4, being the draw-head which the coupling device 12, carried by the opposite draw-head, is about to enter. Now as the cars approach each other and the coupling device 12 enters the draw-head at the right (referring to Figs. 1 to 4, inclusive) the hook-shaped extremity 13 of the coupling device will act on the projection 20 to throw the spindle 18 automatically to the position shown in Fig. 2. The coupling-hook will at the same time drop to engagement with the bolt 24. As the position of the spindle 18 shown in Fig. 2 corresponds with the position of the cam 19 in Fig. 1, it is evident that the cam will be in position to allow the crank-arm 15 to move downwardly, whereby the projection 17, with the spindle 14, assumes the locking position with reference to the coupling device 12.

Attention is called to the fact that the spindles 14 and 18 are held in position by cotters or keys 22, passed through openings formed in the exposed extremities of the spindles, being those remote from the extremities to which the parts 15 and 19 are attached. It will also be observed that when two draw-heads are in the position shown in Figs. 1 to 4, inclusive, the parts 15 and 19 are on opposite sides, whereby the draw-heads are interchangeable. Attention is also called to the fact that the adjacent extremities of the draw-heads are provided with counterpart recesses and projections, whereby they interlock to prevent independent vertical movement. For instance, (referring to Figs. 1 and 4,) the draw-head at the right is provided with a curved projection 23, which is the counterpart of a curved recess or concavity 25, formed on the corresponding side of the opposite draw-head. Again, the side of the right-hand draw-head opposite that containing the projection 23 is provided with a corresponding recess 23ª, adapted to receive a projection 25ª on the corresponding side of the opposite draw-head. This also maintains the interchangeability of the draw-heads, so that they may be made from the same pattern and may be used on all cars and at the same time harmonize for coupling purposes.

Now if it is desired to employ a construction adapted to lock and unlock at either draw-head a coupling device 26 and of the construction shown in Fig. 11 may be employed. This coupling device has two hook-shaped heads 27, and these heads may simultaneously engage the pins 24 in the respective draw-heads. In this case the vertical pin 10 will be dispensed with and the two spindles 14 and 18 of each draw-head will be employed at the same time. Assuming that the cars are coupled and that the coupling device is in the position shown in Fig. 11, if it is desired to uncouple the cars the parts 15 and 19 on either side of the car may be manipulated to raise the hook extremity 27 of the device 26 to the uncoupled position, whereby the cars may separate. When the spindles 14 and 18 of one draw-head are thrown to the position shown in Fig. 3, the corresponding spindles of the opposite draw-head will be in the position shown at the left of Fig. 11, whereby the corresponding coupling-hook 27 will engage the bolt 24, thus holding the coupling device in the one draw-head while it is disconnected from the other draw-head. When this construction is employed, it is evident that the cars may be uncoupled from either side.

Attention is called to the fact that each draw-head is provided with elongated openings (designated A and B, respectively) formed in one side wall thereof in order to allow the projections 17 and 20 of the spindles 14 and 18 to enter the draw-head from the outside. Each draw-head is also provided with two registering openings 21, located in its opposite side walls to receive the pin 24.

Attention is called to the fact that in the construction shown in the drawings the pins 10 and 24 are interchangeable. Hence in the construction shown in Fig. 11 if either head 27 of the coupling device should break the pin 24 could be removed from its position and dropped into the registering openings 8 and 9, passing through an opening 27ᵃ, formed in the coupling device 26. Attention is called to the fact that this coupling device 26 is provided with two openings 27ᵃ, adapted to register with the openings 8 and 9 of the respective draw-heads.

Having thus described our invention, what we claim is—

1. The combination with a draw-head, of a coupling device mounted therein and vertically movable for coupling and uncoupling purposes, the draw-head being also provided with upper and lower spindles provided with projections located within the chamber of the draw-head, and exteriorly-located engaging parts consisting of a cam and an arm, substantially as described.

2. The combination with a draw-head, of a coupling device suitably connected with the draw-head and vertically movable, upper and lower spindles journaled in the draw-head and having interiorly-located projections one of which is adapted to act on the coupling device of the opposite draw-head to hold the latter in the locking position, while the other is adapted to raise the same coupling device to the unlocked position, the two spindles being provided with exteriorly-located engaging parts to facilitate manipulation, for the purpose set forth.

3. The combination with a draw-head having a pin, of a coupling-hook connected with the draw-head and engaging the pin, the said hook being vertically movable for coupling and uncoupling purposes, a second draw-head provided with a pin adapted to be engaged by the coupling-hook of the first-named draw-head, each draw-head being also provided with upper and lower spindles journaled therein and having interiorly-located engaging parts adapted to act on the coupling device for locking and unlocking purposes, the spindles being also provided with exteriorly-located coöperating parts to facilitate manipulation for the purpose set forth.

4. The combination with a draw-head, of a coupling device suitably connected with the draw-head, spindles journaled in the draw-head above and below and having interior projections adapted to act on the coupling device of the opposite draw-head, one of the spindles having an exteriorly-located arm and the other an exteriorly-located cam, the arm and the cam being arranged to coöperate for coupling and uncoupling purposes, the opposite draw-head being provided with a pin adapted to engage the coupling-hook for coupling purposes, substantially as described.

5. The combination of two draw-heads each being provided with a rigid pin, a coupling device having two hook-shaped extremities adapted to engage both pins when the draw-heads are coupled, each draw-head being also provided with upper and lower spindles having projections adapted to act on the adjacent extremities of the coupling device, the spindles being also provided with exteriorly-located engaging parts to facilitate manipulation.

6. The combination with two draw-heads, of a coupling device having hook-shaped extremities adapted to enter the respective draw-heads, devices located in the lower parts of the draw-heads for engaging the coupling-hook extremities, upper and lower spindles journaled in each draw-head and adapted to act on the adjacent extremity of the coupling device for unlocking and locking purposes, the said spindles of the draw-heads being provided with exteriorly-located parts engaging for coupling and uncoupling purposes, the exterior parts on the two draw-heads being located on opposite sides for the purpose set forth.

In testimony whereof we affix our signatures in presence of two witnesses.

SOLOMON W. WIBEL.
WILLIAM R. CUNNINGHAM.
HORACE A. GRAY

Witnesses:
  DENA NELSON,
  A. J. O'BRIEN.